(12) United States Patent
Oozeki (10) Patent No.: US 10,167,543 B2
(45) Date of Patent: Jan. 1, 2019

(54) METHOD FOR MANUFACTURING OPTICAL FIBER PREFORM

(71) Applicant: FUJIKURA LTD., Tokyo (JP)

(72) Inventor: Nobuo Oozeki, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/212,710

(22) Filed: Jul. 18, 2016

(65) Prior Publication Data

US 2017/0037501 A1 Feb. 9, 2017

(30) Foreign Application Priority Data

Aug. 7, 2015 (JP) .................................. 2015-157537

(51) Int. Cl.
| | |
|---|---|
| *C23C 4/11* | (2016.01) |
| *C23C 4/129* | (2016.01) |
| *G02B 1/10* | (2015.01) |
| *G02B 6/02* | (2006.01) |

(52) U.S. Cl.
CPC ................. *C23C 4/129* (2016.01); *C23C 4/11* (2016.01); *G02B 1/10* (2013.01); *G02B 6/02* (2013.01)

(58) Field of Classification Search
CPC ..................................... C23C 4/11; G02B 6/02
See application file for complete search history.

(56) References Cited

U.S. PATENT DOCUMENTS

| | | | |
|---|---|---|---|
| 4,661,140 A | 4/1987 | Takimoto et al. | |
| 5,599,371 A * | 2/1997 | Cain .................. | C03B 19/1423 65/17.4 |
| 5,838,866 A | 11/1998 | Antos et al. | |
| 6,128,928 A | 10/2000 | Antos et al. | |
| 6,260,385 B1 | 7/2001 | Sempolinski et al. | |
| 2013/0011319 A1 | 1/2013 | Bernstein et al. | |
| 2013/0091900 A1 | 4/2013 | Yoshida | |
| 2013/0205832 A1 | 8/2013 | Miyasaka et al. | |
| 2014/0338400 A1* | 11/2014 | Yamazaki ............... | F23D 14/22 65/421 |

FOREIGN PATENT DOCUMENTS

| | | |
|---|---|---|
| CN | 1154345 A | 7/1997 |
| CN | 104163569 A | 11/2014 |

(Continued)

OTHER PUBLICATIONS

Office Action dated Feb. 28, 2017, issued in counterpart Japanese Patent Application No. 2015-157537, with full English translation. (7 pages).

(Continued)

*Primary Examiner* — Elizabeth A Burkhart (74) *Attorney, Agent, or Firm* — Westerman, Hattori, Daniels & Adrian, LLP (57) ABSTRACT

Provided is a method for manufacturing an optical fiber preform. In a premixing step, a source-material-containing gas containing organosilicon is mixed with premix-use oxygen gas so as to obtain a premixed source material gas. In the premixing step, the premix-use oxygen gas has a temperature greater than or equal to a liquefaction temperature of the organosilicon, the liquefaction temperature being determined depending on an amount of the organosilicon contained in the premixed source material gas.

12 Claims, 3 Drawing Sheets

(56) References Cited

FOREIGN PATENT DOCUMENTS

| | | |
|---|---|---|
| EP | 0 635 460 A2 | 1/1995 |
| EP | 2 311 781 A1 | 4/2011 |
| JP | 55-23067 A | 2/1980 |
| JP | 60-260437 A | 12/1985 |
| JP | 61-191533 A | 8/1986 |
| JP | 63-21233 A | 1/1988 |
| JP | 07-81965 A | 3/1995 |
| JP | 09-171120 A | 6/1997 |
| JP | 2000-63126 A | 2/2000 |
| JP | 2003-226544 A | 8/2003 |
| JP | 2011-102232 A | 5/2011 |
| JP | 2013-87020 A | 5/2013 |
| JP | 2013-177297 A | 9/2013 |
| JP | 2014-520747 A | 8/2014 |
| JP | 2014-224007 A | 12/2014 |

OTHER PUBLICATIONS

Office Action dated Jun. 1, 2018, issued in counterpart Chinese application No. 201610630881.4, with English translation. (13 pages).

\* cited by examiner

| MASS FLOW RATE OF SOURCE MATERIAL (g/min) | GAS TEMPERATURE (°C) | | | |
|---|---|---|---|---|
| | 50 | 100 | 150 | 175 |
| 50 | PRACTICALLY IMPOSSIBLE 540slm | 40 | 3.8 | 0.04 |
| 40 | PRACTICALLY IMPOSSIBLE 435 | 31.9 | 3.0 | 0.03 |
| 30 | PRACTICALLY IMPOSSIBLE 325 | 23.9 | 2.3 | 0.02 |
| 20 | PRACTICALLY IMPOSSIBLE 217 | 15.9 | 1.5 | 0.015 |
| 10 | PRACTICALLY IMPOSSIBLE 108 | 7.97 | 0.7 | — |

FIG. 4

| TEMPERATURE | SATURATED VAPOR PRESSURE OF OMCTS | |
|---|---|---|
| °C | mmHg | atm |
| 90 | 42.8 | 0.056 |
| 100 | 65.8 | 0.087 |
| 110 | 98.1 | 0.129 |
| 120 | 142.2 | 0.187 |
| 130 | 201.4 | 0.265 |
| 140 | 278.8 | 0.367 |
| 150 | 378.4 | 0.498 |
| 160 | 504.4 | 0.664 |
| 170 | 661.1 | 0.870 |
| 180 | 853.4 | 1.123 |
| 190 | 1086.4 | 1.429 |

METHOD FOR MANUFACTURING OPTICAL FIBER PREFORM

This Nonprovisional application claims priority under 35 U.S.C. § 119 on Patent Application No. 2015-157537 filed in Japan on Aug. 7, 2015, the entire contents of which are hereby incorporated by reference.

TECHNICAL FIELD

The present invention relates to a method for manufacturing an optical fiber preform with use of organosilicon as a source material.

BACKGROUND ART

An optical fiber preform is manufactured by, for example, (i) depositing $SiO_2$ soot on a target via a VAD method or some other method and (ii) sintering the $SiO_2$ soot thus deposited, in some existing techniques for producing $SiO_2$ soot (see Patent Literatures 1 through 3, for example), $SiCl_4$, which is a conventional source material of $SiO_2$ soot, is replaced with organosilicon. The organosilicon is combusted in an oxyhydrogen flame (reaction field) with, use of a burner or other such apparatus so that $SiO_2$ soot is produced. In comparison to $SiCl_4$, using organosilicon is advantageous in that, for example, it avoids the creation of hazardous hydrochloric acid and requires less hydrogen than conventional methods.

In order to accelerate production of the $SiO_2$ soot, an organosilicon source material needs to be supplied in great amounts. However, complete combustion of large amounts of organosilicon (concentrated organosilicon gas) is difficult. This causes a reaction of the organosilicon in the reaction field to be insufficient, thereby causing (i) impurity gel, impurity particulate, or the like to adhere to the burner (ii) carbon to adhere to the $SiO_2$ soot, or (iii) formation of imperfections in the $SiO_2$ soot. In order to address issue, the organosilicon is premixed with an oxygen gas prior to combustion in order to improve reactivity of the organosilicon.

CITATION LIST

Patent Literatures

[Patent Literature 1]
Japanese Patent Application Publication Tokukai No. 2000-63126 (Publication date: Feb. 29, 2000)
[Patent Literature 2]
Japanese Translation of PCT International Application Tokuhyo No, 2014-520747 (Publication date: Aug. 25, 2014)
[Patent Literature 3]
Japanese Patent Application Publication Tokukai No. 2013-177297 (Publication date: Sep. 9, 2013)

SUMMARY OF INVENTION

Technical Problem

Unfortunately, prior art such as that mentioned above exhibits the following problems. Specifically, a temperature of a gas containing the organosilicon may be lowered in a case where the gas is premixed with an oxygen gas, which has a comparatively low temperature. In a case where the temperature of the gas containing the organosilicon is lowered prior to the reaction by which the $SiO_2$ soot is produced, the organosilicon, having a low vapor pressure, liquefies. Once the organosilicon liquefies in this manner, it becomes a hazard, since droplets of the organosilicon can be thrown from the burner while still ignited. Furthermore, the droplets adhering to a nozzle of the burner cause an irregular gas flow. This inhibits uniform deposit of glass particulate on the $SiO_2$ soot after the reaction, there-fey reducing a quality of the optical fiber preform. Still further, in a worst-case scenario, a large amount of droplets can temporarily block up the nozzle and prevent an outflow of the gas. This can potentially cause flames to travel back up a burner pipe, and consequently cause an explosion within the burner.

The present invention was made in view of the aforementioned problems. An object of the present invention lies in manufacturing an optical fiber preform while preventing organosilicon from liquefying prior to a reaction by which $SiO_2$ soot is produced, so as to improve safety and stability of the reaction.

Solution to Problem

A method for manufacturing an optical fiber preform in accordance with the present invention includes the steps of: (a) premixing a source-material-containing gas with an oxygen gas so as to obtain a premixed source material gas, the source-material-containing gas containing organosilicon which is in a gaseous or atomized state; and (b) producing $SiO_2$ soot by (i) supplying, to a burner, the premixed source material gas and a combustion gas and (ii) reacting the organosilicon in a flame, the oxygen gas having, in the step (a), a temperature greater than or equal to a liquefaction temperature of the organosilicon, which liquefaction temperature is dependent on an amount of the organosilicon contained in the premixed source material gas.

Advantageous Effects of Invention

The present invention makes it possible to manufacture an optical fiber preform while preventing organosilicon from liquefying prior to a reaction by which $SiO_2$ soot is produced, so as to improve safety and stability of the reaction.

DESCRIPTION OF EMBODIMENTS

An embodiment of the present invention will be discussed below in detail.

[$SiO_2$ Soot-producing Apparatus]

Figure 1:
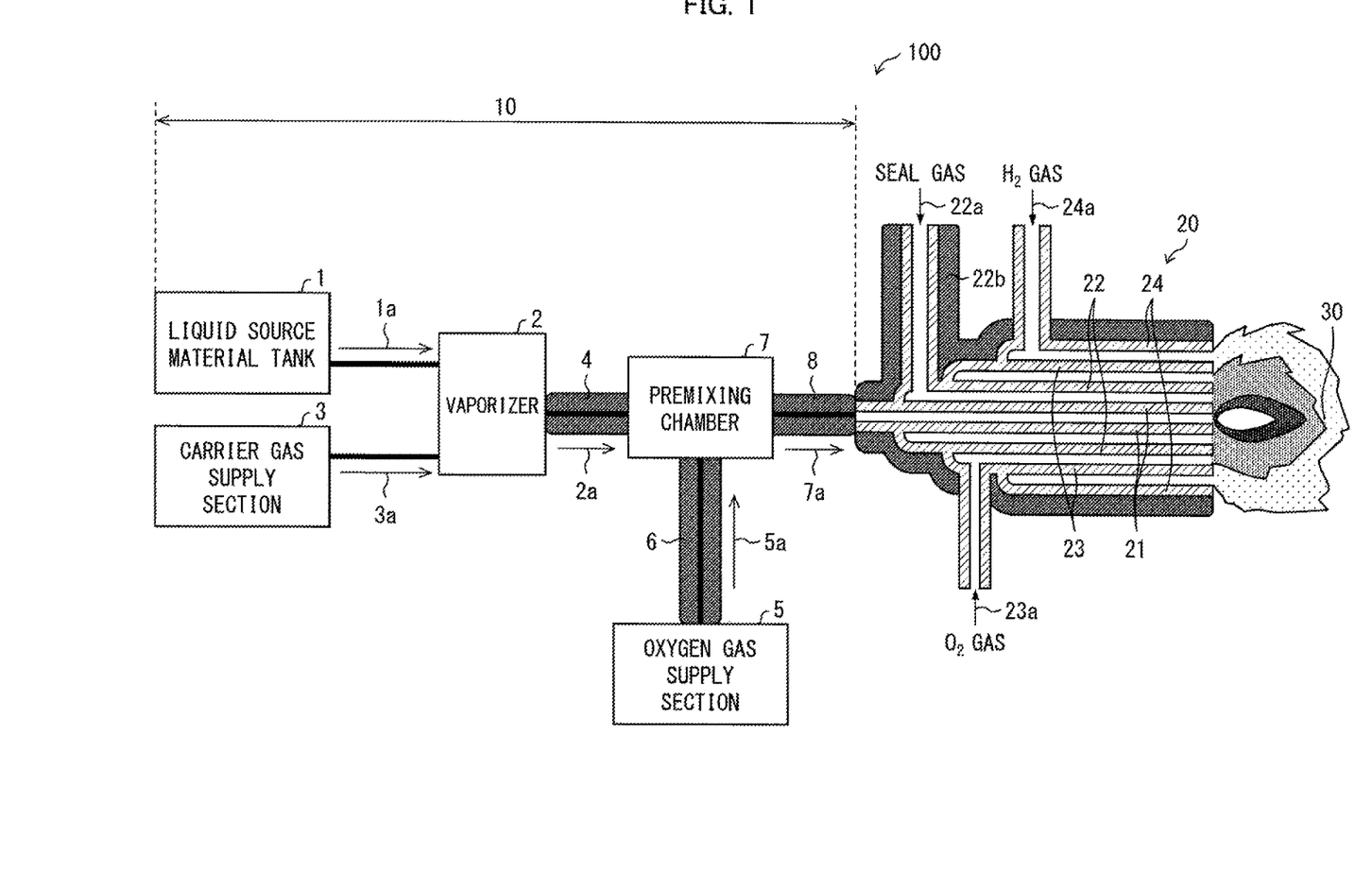
FIG. 1 is a view schematically illustrating a configuration of a $SiO_2$ soot-producing apparatus, in accordance with one embodiment of the present invention, for producing $SiO_2$ soot used to manufacture an optical fiber preform.
Figure 2:
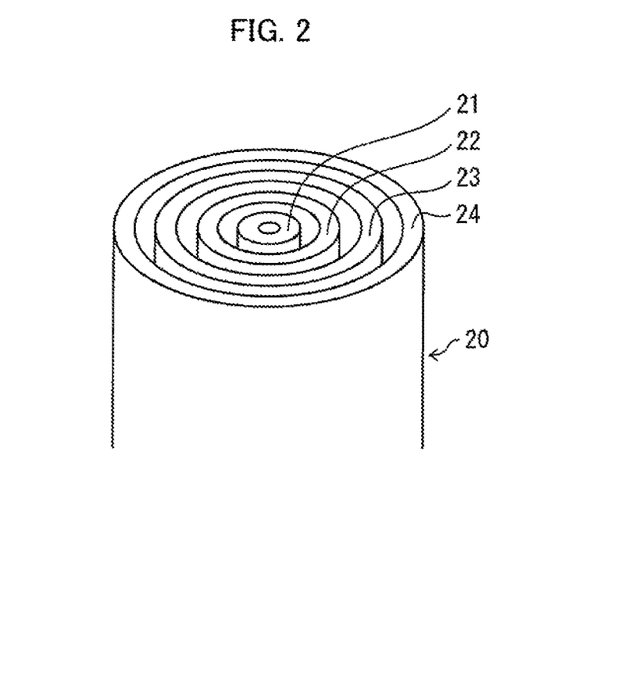
FIG. 2 is a perspective view illustrating a vicinity of an outlet of a burner provided to the $SiO_2$ soot-producing apparatus.

In the present embodiment, $SiO_2$ soot is deposited on a target so as to manufacture an optical fiber preform. Here, firstly, one example configuration of a $SiO_2$ soot-producing apparatus will be described below with reference to FIGS. 1 and 2. FIG. 1 is a view schematically illustrating a configuration of a $SiO_2$ soot-producing apparatus 100 in accordance with the present embodiment. FIG. 2 is a perspective view illustrating a burner 20 provided to the $SiO_2$ soot-producing apparatus 100.

As illustrated in FIG. 1, the $SiO_2$ soot-producing apparatus 100 includes a source material gas preparation section 10 and the burner 20.

The source material gas preparation section 10 includes a liquid source material tank 1, a vaporizer 2, a carrier gas supply section 3, a first tube 4, an oxygen gas supply section 5, a second tube 6, a premixing chamber 7, and a third tube 8.

Organosilicon 1a is stored in a liquid state in the liquid source material tank 1. Examples of the organosilicon 1a used in the present embodiment encompass organosiloxane such as cyclic siloxane and polymethylsiloxane. In selecting the organosilicon 1a, factors, such as storability, transportability, a boiling point, and reactivity, of an organosilicon source material are considered. Specifically, it is preferable that the organosilicon source material be a liquid at an ordinary temperature, have a low boiling point, and be highly reactive. In the present embodiment, octamethylcyclotetrasiloxane (OMCTS) or hexamethyldisiloxane (HMDSO) is preferably used as the organosilicon 1a. The following description will discuss a case in which OMCTS is used as the organosilicon 1a. Note, however, that a different type of organosiloxane or a different type of organosilicon can be alternatively used as the organosilicon 1a.

The vaporizer 2 is a device which heats the organosilicon 1a, supplied in a liquid state from the liquid source material tank 1, so that the organosilicon 1a is converted into a gaseous or atomized state. Hereinafter, the organosilicon 1a thus converted into a gaseous or atomized state may be referred to as an organosilicon gas 1a or a source material gas 1a. Note that the organosilicon 1a in a gaseous state may include the organosilicon 1a in an atomized state.

The vaporizer 2 also heats a carrier gas 3a supplied from the carrier gas supply section 3. The carrier gas 3a can be supplied in a gaseous state or in a liquid state. The carrier gas 3a does not react with the organosilicon 1a. Examples of the carrier gas 3a encompass gases such as argon fan inert gas), nitrogen (an inert gas), oxygen, helium (an inert gas), and a mixed gas composed of any of these gases. The carrier gas 3a is preferably oxygen, a mixed gas composed of argon and oxygen, or a mixed gas composed of nitrogen and oxygen. By using, as the carrier gas 3a, the mixed gas composed of oxygen and either argon or nitrogen, it becomes possible to more safety carry the source material gas 1a. Alternatively, if safety has otherwise been, ensured, then oxygen can be used as the carrier gas 3a, Using oxygen as the carrier gas 3a makes it possible to combust the source material gas 1a with greater efficiency.

Note, here, that it is possible to control, with use of a mass flow controller (not illustrated) or some other such device, each amount of (i) the organosilicon 1a, being in a liquid state, and (ii) the carrier gas 3a each supplied to the vaporizer 2. Note that some other alternative means of flow control can be used to control such a supplied amount.

In the present embodiment, the vaporizer 2 heats the organosilicon 1a and the carrier gas 3a to 200° C. Such a temperature to which the vaporizer 2 heats the organosilicon 1a and the carrier gas 3a is not limited to being 200° C. and can be determined in accordance with various conditions such as the boiling point and the amount of the organosilicon 1a. Mote that a gas obtained by mixing the organosilicon gas 1a with the carrier gas 3a will be hereinafter referred to as a source-material-containing gas 2a. Once heated to a temperature of 200° C., the source-material-containing gas 2a is supplied from the vaporizer 2 to the premixing chamber 7 via the first tube 4. Note, here, that the first tube 4 is configured so that a gas that flows therethrough is heated. This prevents the temperature of the source-material-containing gas 2a from dropping, specifically, dropping to 200° C. or lower. Heating in the first tube 4 is accomplished by providing the first tube 4 with a heater (for example, by wrapping the first pipe 4 with a ribbon heater) or by forming the first tube 4 from a heating tube. Note that heating of the gas in the first tube 4 can be accomplished by some other alternative means. In a similar manner, heating of a gas that flows through the second tube 6, the third tube 8, a fourth tube 22b, and the burner 20 (each later described) is accomplished by a heater, a heating tube, or some other alternative means.

The premixing chamber 7 is a chamber in which the source-material-containing gas 2a is premixed with a premix-use oxygen gas 5a. The premix-use oxygen gas 5a is supplied from the oxygen gas supply section 5 to the premixing chamber 7 via the second tube 6. Note, here, that the second tube 6 is configured so that a gas that flows therethrough is heated. The premix-use oxygen gas 5a is premixed, in a heated state, with the source-material-containing gas 2a. This heating is discussed in a later paragraph in detail. A gas obtained by premixing the premix-use oxygen gas 5a with the source-material-containing gas 2a will be hereinafter referred to as a premised source material gas 7a. The pre mixed source material gas 7a Is sent from the premixing chamber 7 to the burner 20 via the third tube 8. The third tube 8 is configured so that a gas that flows therethrough is heated. This prevents a drop in temperature of the premixed source material gas 7a.

The burner 20 is a burner for use in manufacturing an optical fiber preform. As illustrated in FIGS. 1 and 2, the burner 20 is a multi-tube burner. Mote that although the burner 20 is described as being a multi-tube burner in the present embodiment, this is a non-limiting example. The burner 20 can alternatively be, for example, a multi-nozzle burner, having a plurality of nozzles, or some other type of burner.

The burner 20 includes, in the following order from the center thereof, (i) a source material gas tube 21 which is connected to the third tube 8 and through which the premixed source material gas 7a flows, (ii) a seal gas tube 22 through which a seal gas 22a flows, (iii) an oxygen gas tube 23 through which a combustion oxygen gas 23a (combustion gas) flows, and (iv) a hydrogen gas tube 24 through which a hydrogen gas 24a (combustion gas) flows.

Note that the order of the oxygen gas tube 23 and the hydrogen gas tube 24 can be reversed. Note also that the source material gas tube 21 can be provided in a position other than the center of the burner 20. The combustion-use oxygen gas 23a and the hydrogen gas 24a are materials which are used to form a flame (oxyhydrogen flame) in a reaction field 30 where the organosilicon gas 1a is reacted so as to produce the $SiO_2$ soot. Note that although the reaction field 30 is located in the oxyhydrogen flame in the present embodiment, this example is non-limiting.

The seal gas 22a causes the premixed source material gas 7a to be separated from the combustion-use oxygen gas 23a and the hydrogen gas 24a. That is, the seal gas 22a prevents the organosilicon gas 1a contained in the premixed source material gas 7a from reacting in a vicinity of an outlet of the burner 20. This makes it possible to prevent blockage of the outlet of the burner 20 which blockage is caused by a reaction of the organosilicon gas 1a and subsequent deposition of the $SiO_2$ soot in the vicinity of the outlet. Note that it is possible to control a position at which the reaction of the organosilicon gas 1a occurs by altering a flow velocity of the seal gas 22a. In the present embodiment, the seal gas 22a is used such that the reaction of the organosilicon gas 1a occurs at a position away from the outlet of the burner 20.

The seal gas 22a may therefore be any gas that is not active in the reaction of the organosilicon gas 1a. Examples of the seal gas 22a encompass helium, nitrogen, argon, and a mixed gas composed of any of these gases. Note that another gas not mentioned here can alternatively be used.

The seal gas 22a is introduced into the burner 20 via the fourth tube 22b, and is sent to the seal gas tube 22. Note, here, that the fourth tube 22b is configured so that a gas that flows therethrough is heated. The seal gas 22a is introduced, in a heated state, into the burner 20. This heating of the seal gas 22a will be discussed in detail in a later paragraph. Furthermore, the burner 20 is configured so that a gas that flows therethrough is heated. This prevents a drop in temperature of the gas that flows through the burner 20.

(Heating of Premix-Use Oxygen Gas and Seal Gas)

In a case where, for example, the premix-use oxygen gas 5a having an ordinary temperature is premixed with the source-material-containing gas 2a in the premixing chamber 7, the premixed source material gas 7a thus obtained will have a lowered temperature. Furthermore, the seal gas tube 22, through which the seal gas 22a flows, is formed so that the seal gas tube 22 surrounds the source material gas tube 21. Because of this fact, in a case where, for example, the seal gas 22 a having an ordinary temperature flows through the seal gas tube 22, the premixed source material gas 7a, which flows through the source material gas tube 21 disposed within the seal gas tube 22, will be cooled. In a case where the temperature of the premixed source material gas 7a becomes equal to or lower than a liquefaction temperature of the organosilicon 1a contained in the premixed source material gas 7a, the organosilicon 1a contained in the premixed source material gas 7a will liquefies.

To prevent this issue, according to the $SiO_2$ soot-producing apparatus 100, the premix-use oxygen gas 3a and the seal gas 22a are heated such that their respective temperatures are greater than or equal to the liquefaction temperature of the organosilicon 1a, which liquefaction temperature is dependent on the amount of the organosilicon 1a contained in the premised source material gas 7a.

Note that although the $SiO_2$ soot-producing apparatus 100 of the present embodiment does not employ a configuration in which, the combustion-use oxygen gas 23a and the hydrogen gas 24a are heated before being sent to the burner 20, the $SiO_2$ soot-producing apparatus 100 can alternatively employ such a configuration.

(Liquefaction Temperature of Organosilicon)

Figure 3:
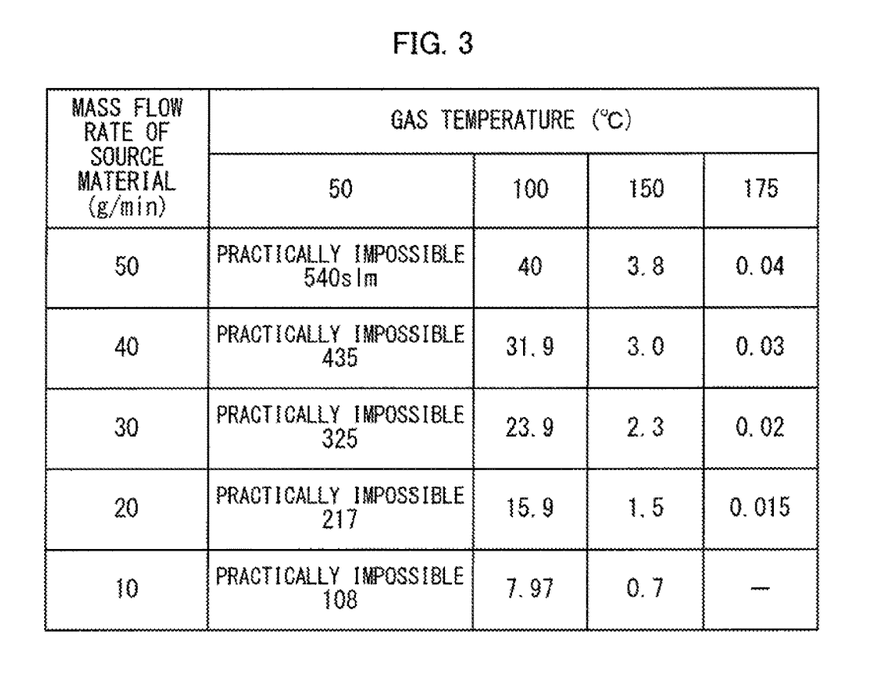
FIG. 3 is a table showing a flow rate of gases, other than OMCTS, that are contained in a premixed source material gas and that are necessary for vaporization of OMCTS.

Next, the liquefaction temperature of the organosilicon gas 1a contained in the premixed source material gas 7a will be discussed below with reference to FIG. 3. FIG. 3 is a table showing a flow rate of gases, other than OMCTS serving as the organosilicon 1a, that are contained in the premixed source material gas 7a and that are necessary for complete vaporization of the OMCTS (hereinafter, referred to as "other gases"). The flow rate of the other gases varies depending on a supplied amount of the OMCTS and the temperature of the premixed source material gas 7a.

Note that it is possible to control, with use of a mass flow controller or some other such device, (i) a flow rate of the organosilicon 1a, being in a liquid state, and (ii) a flow rate of the carrier gas 3a, the organosilicon 1a and the carrier gas 3a each being supplied to the vaporizer 2. It is also possible to control, in the same manner, a flow rate of the premix-use oxygen gas 5a supplied to the premixing chamber 7. This makes it possible to control a ratio of the organosilicon gas 1a to the other gases, the organosilicon gas 1a and the other gases being contained in the premixed source material gas 7a. Note, here, that although the term "ratio" essentially refers to a molar ratio, the "ratio" that is controlled can be a ratio of a mass or volumetric flow rate of a liquid or gas to that of the other liquid or gas. Similarly, a parameter displayed in such a ratio can be mass or volumetric flow rate of a liquid or gas.

Once the abovementioned ratio in the premixed source material gas 7a is determined, the liquefaction temperature of the organosilicon 1a is calculated as follows.

A partial pressure Pp of the organosilicon 1a can be calculated from the ratio of a volume of the organosilicon 1a to a volume of the other gases, the organosilicon 1a and the other gases being contained in the premixed source material gas 7a. This partial pressure Pp refers to a partial pressure of the organosilicon 1a which has been completely vaporized.

Figure 4:
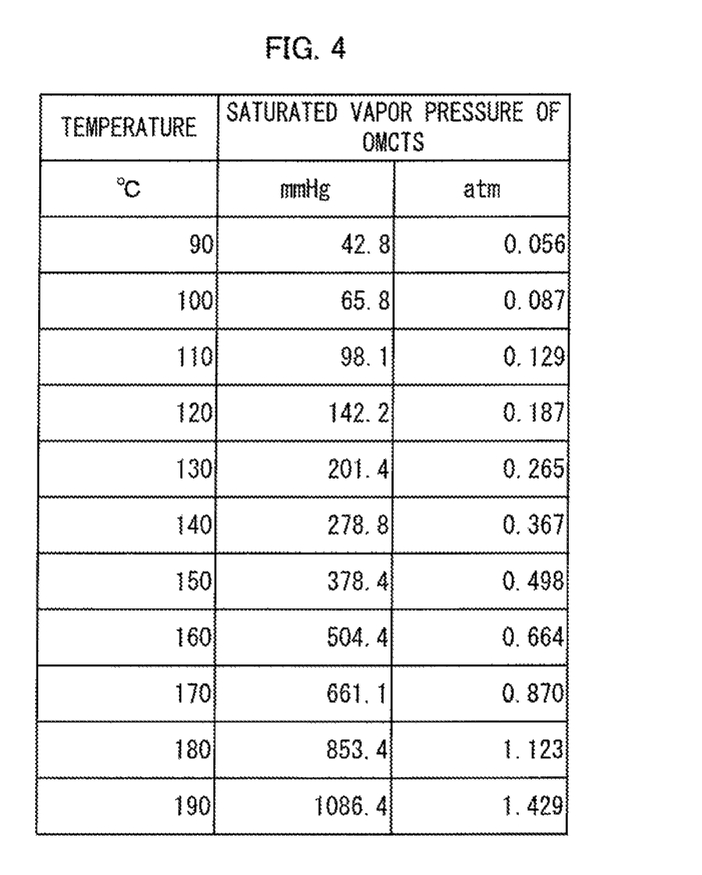
FIG. 4 is a view illustrating a relation between a temperature of OMCTS and a vapor pressure of OMCTS.

Note, here, that the liquefaction temperature of the organosilicon 1a contained in the premixed source material gas 7a refers to a temperature at which, a vapor pressure of the organosilicon 1a is equivalent to the abovementioned partial pressure Pp. For example, a vapor pressure of the OMCTS (i.e., the organosilicon 1a in the present embodiment) having a given temperature is as shown in FIG. 4. As shown in FIG. 4, in a case where the OMCTS has a temperature of 100° C., its vapor pressure is 0.087 atm. That is, in a case where the organosilicon 1a contained in the premixed source material gas 7a has a partial pressure of 0.087 atm, the liquefaction temperature of the organosilicon source material is 100° C. Thus, in a case where (i) the organosilicon 1a contained in the premixed source material gas 7a has a partial pressure of 0.087 atm and (ii) the temperature of the premixed source material gas 7a becomes equal to or less than 100° C., the organosilicon 1a will liquefy.

<Method for Manufacturing Optical Fiber Preform>

A method for manufacturing an optical fiber preform in accordance with the present embodiment is as follows.

Firstly, the source-material-containing gas 2a, which contains the organosilicon 1a being in a gaseous or atomized state, is premixed with the premix-use oxygen gas 5a so as to obtain the premixed source material gas 7a (premixing step). Next, the premixed source material gas 7a, the seal gas 22a, the combustion-use oxygen, gas 23a, and the hydrogen gas 24a are supplied to the burner 20, and the organosilicon 1a contained in the premixed source material gas 7a is reacted in an oxyhydrogen flame so as to produce the $SiO_2$ soot ($SiO_2$ soot producing step).

After the $SiO_2$ soot producing step, the $SiO_2$ soot is heated so as to be transparent (heating step). As a result, an optical fiber preform is manufactured. Note that a known technique can be used in the heating step.

In the premixing step, the premix-use oxygen gas 5a has a temperature greater than or equal to the liquefaction temperature of the organosilicon 1a, the liquefaction temperature being determined depending on the amount of the organosilicon 1a contained in the premixed source material gas 7a. This brings about the following effects. That is, it is possible to prevent cooling of the premixed source material gas 7a which cooling is caused by premixing the source-material-containing gas 2a with the premix-use oxygen gas 5a. In turn, it is possible to prevent the organosilicon 1a contained in the premixed source material gas 7a from liquefying. It therefore becomes possible to prevent, problems that would be caused by liquefaction of the organosilicon 1a.

It is particularly preferable that in the pre mixing step, the premix-use oxygen gas 5a have a temperature of 110° C. or greater. Since the source material-containing gas 2a is vaporized at 200° C. as described above, using the premix-use oxygen gas 5a having a temperature of 110° C. or greater ensures that the temperature of the premixed source material gas 7a will be at least 110° C. or greater. In a case where (i) it is intended that the amount of the organosilicon 1a to be reacted is increased and (ii) the premixed source material gas 7a is below 110° C., it would become necessary that the premixed source material gas 7a containing an unfeasibly large amount of the other gases be sent to the burner 20. However, in a case where the source-material-containing gas 2a is premixed with the premix-use oxygen gas 5a having a temperature of 110° C. or greater, the premixed source material gas 7a will have a temperature of at least 110° C. or greater. This requires merely a feasible amount of the other gases.

Note that in a case where OMCTS is used as the organosilicon 1a, it is assumed that a vapor pressure of the OMCTS is 0.129 atm at 110° C., as shown in FIG. 4. Due to this fact, in a case where a partial pressure of the OMCTS contained in the premixed source material gas 7a is 0.129 atm or lower, it is possible to, by premixing the source-material-containing gas 2a with the premix-use oxygen gas 5a having a temperature of 110° C. or greater, reliably prevent the liquefaction of the organosilicon 1a which liquefaction is caused by oxygen premixing.

Furthermore, in the soot producing step, the seal gas 22a having a temperature greater than or equal to the liquefaction temperature of the organosilicon 1a, which liquefaction temperature is dependent on the amount of the organosilicon 1a contained in the premixed source material gas 7a, is supplied to the burner 20. This brings about the following effects. That is, it is possible to prevent cooling of the premixed source material gas 7a which cooling is caused by supplying the seal gas 22a to the burner 20. In turn, it is possible to prevent the organosilicon 1a contained in the premixed source material gas 7a from liquefying. It therefore becomes possible to prevent, problems that would be caused by the liquefaction of the organosilicon 1a.

Thus, using the method for manufacturing an optical fiber preform in accordance with the present embodiment makes it possible to manufacture an optical fiber preform while preventing; organosilicon from liquefying prior to a reaction by which $SiO_2$ soot is produced, so as to improve safety and stability of the reaction. Furthermore, since the organosilicon is provided for the reaction in a gaseous or atomized state, the organosilicon is highly reactive. This makes it possible to improve a quality of the $SiO_2$ soot. As a result, it is possible to manufacture a high-quality optical fiber safely and efficiently by using an optical fiber preform manufactured via the method in accordance with the present embodiment.

It is particularly preferable that the seal gas 22a provided to the burner 20 have a temperature greater than or equal to that of the premix-use oxygen gas 5a. In a case where the temperature of the seal gas 22a is lower than that of the premixed source material gas 7a, the premixed source material gas 7a will be cooled while flowing through the burner 20. However, in a case where the seal gas 22a has the same temperature as the premix-use oxygen gas 5a (a temperature greater than or equal to the liquefaction temperature of the organosilicon 1a), it is possible to prevent a drop in the temperature of the premixed source material gas 7a flowing through the burner 20. This makes it possible to prevent the liquefaction of the organosilicon 1a contained in the premixed source material gas 7a.

In the above discussion, the combustion-use oxygen gas 23a and the hydrogen gas 24a are not heated while supplied to the burner 20. Note however, that they can be heated in an alternative configuration.

The method for manufacturing an optical fiber preform in accordance with the present embodiment can be utilized in, for example, a YAD method, an ST method, or an OVD method.

An optical fiber can be manufactured by drawing out (drawing step) an optical fiber preform manufactured in accordance with the above method. In the drawing step, a known technique can be used.

EXAMPLES

As detailed below, it was verified that the $SiO_2$ soot-producing apparatus 100 described above can be used to prevent the liquefaction of the organosilicon 1a during the production of the $SiO_2$ soot.

Example 1

OMCTS was used as organosilicon 1a, and argon was used as both a carrier gas 3a and a seal gas 22a. The OMCTS (organosilicon 1a) was supplied in a liquid state to a vaporizer 2 at a mass flow rate of 22 g/min, and the carrier gas 3a was supplied to the vaporizer 2 at a volumetric flow rate of 2.5 slm. The OMCTS and the carrier gas 3a were heated to 200° C. by the vaporizer 2, to obtain a source-material-containing gas 2a composed of (i) the OMCTS having been vaporized and (ii) the carrier gas 3a.

A premix-use oxygen gas 5a, having been heated to 150° C. was premixed, at a volumetric flow rate of 9 slm, with the source-material-containing gas 2a to obtain a premixed source material gas 7a. The premixed source material gas 7a was then sent to a burner 20.

In so doing, a flow rate of the OMCTS, being in a gaseous state, was approximately 1.66 slm, and a flow rate of gases, other than the OMCTS, that were contained in the premixed source material gas 7a (hereinafter, referred to as "other gases") was 11.5 slm. Assuming that a pressure in the burner 20 was 1 (one) aim, a partial pressure of the OMCTS contained in the premixed source material gas 7a was approximately 0.126 atm. A vapor pressure of OMCTS becomes 0.126 atm at a temperature of approximately 109° C. That is, under these conditions, a liquefaction temperature of the OMCTS contained in the premixed source material gas 7a was approximately 109° C.

Furthermore, the seal gas 22a, having- been heated to 150° C., was introduced into a seal gas tube 22.

In a case where $SiO_2$ soot was produced in an oxyhydrogen flame under the above conditions, the OMCTS contained in the premixed source material gas 7a did not liquefy prior to a reaction in the oxyhydrogen flame. It can be concluded that this was due to the fact that since the premix-use oxygen gas 5a and the seal gas 22a both had a temperature of 150° C. the OMCTS contained in the premixed source material gas 7a was prevented from having a temperature lower than the liquefaction temperature (approx. 109° C.) even after being affected by the temperature of the premix-use oxygen gas 5a or the seal gas 22a.

Comparative Example 1

SiO$_2$ soot was produced under conditions similar to those in Example 1, except, that, respective temperatures of a premix-use oxygen gas 5a and a seal gas 22a were altered to be 100° C.

In Comparative Example 1, OMCTS contained in a premixed source material gas 7a liquefied prior to a reaction in an oxyhydrogen flame. It can be concluded that this was due to the fact that the premix-use oxygen gas 5a and the seal gas 22a both had a temperature of 100° C., which caused a temperature of the OMCTS contained in the premixed source material gas 7a to drop below a liquefaction temperature (approx. 109° C.) of the OMCTS.

Example 2

SiO$_2$ soot was produced under conditions similar to those in Example 1, except for the conditions specified below. OMCTS was used at a mass flow rate of 24.5 g/min (equivalent to a volumetric flow rate of 1.85 slm), A carrier gas 3a and a premix-use oxygen gas 5a were mixed such that a flow rate of gases, other than the OMCTS, which were contained in a premixed source material gas 7a was 12.7 slm. A seal gas 22a and the premix-use oxygen gas 5a each had a temperature of 100° C.

Under these conditions, the OMCTS contained in the premixed source material gas 7a had a partial pressure of 0.127 atm and a liquefaction temperature of approximately 109° C.

In a case where the SiO$_2$ soot was produced under the above conditions, the OMCTS contained in the premised source material gas 7a did not liquefy prior to a reaction in an oxyhydrogen flame. It can be concluded that this was due to the fact that since the premix-use oxygen gas 5a and the seal gas 22a both had a temperature of 110° C., the OMCTS contained in the premixed source material gas 7a was prevented from having a temperature lower than a liquefaction temperature of the OMCTS even after being affected by the temperature of the premix-use oxygen gas 5a or the seal gas 22a.

Example 3

SiO$_2$ soot was produced under conditions similar to those in Example 1, except for the conditions specified below, OMCTS was used at a mass flow rate of 20.1 g/min (equivalent to a volumetric flow rate of 1.52 slm). A carrier gas 3a and a premix-use oxygen gas 5a were mixed such that a flow rate of gases, other than the OMCTS, which were contained in a premixed source material gas 7a was 10.5 slm. A seal gas 22a and the premix-use oxygen gas 5a each had a temperature of 110° C.

Under these conditions, the OMCTS contained in the premixed source material gas 7a had a partial pressure of 0.126 atm and a liquefaction temperature of approximately 109° C.

In a case where the SiO$_2$ soot was produced under the above conditions, the OMCTS contained in the premixed source material gas 7a did not liquefy prior to a reaction in the reaction field 30. It can be concluded that this was due to the fact that since the premix-use oxygen gas 5a and the seal gas 22a both had a temperature of 110° C., the OMCTS contained in the premixed source material gas 7 a was prevented from having a temperature lower than the liquefaction temperature even after being affected by the temperature of the premix-use oxygen gas 5a or the seal gas 22a.

The results of Examples 1 through 3 and Comparative Example 1 confirmed that a liquefaction temperature of organosilicon 1a is dependent on (i) a supplied amount of the organosilicon 1a (for example, OMCTS) and (ii) a supplied amount of gases, other than the organosilicon 1a, contained in a premixed source material gas 7a. That is, the liquefaction temperature of the organosilicon 1a is dependent on an amount of the organosilicon 1a contained in the premixed source material gas 7a. Furthermore, it was confirmed that it was possible to prevent liquefaction of the organosilicon 1a contained in the premixed source material gas 7a by heating a premix-use oxygen gas 5a and a seal gas 22a to a temperature greater than or equal to the liquefaction temperature of the organosilicon 1a.

[Overview]

A method for manufacturing an optical fiber preform in accordance with the present invention includes the steps of: (a) premixing a source-material-containing gas with an oxygen gas so as to obtain a premixed source material gas, the source-material-containing gas containing organosilicon which is in a gaseous or atomized state; and (b) producing SiO$_2$ soot by (i) supplying, to a burner, the premixed source material gas and a combustion gas and (ii) reacting the organosilicon in a flame, the oxygen gas having, in the step (a), a temperature greater than or equal to a liquefaction temperature of the organosilicon, which liquefaction temperature is dependent on an amount of the organosilicon contained in the premixed source material gas.

According to the above method, the oxygen gas to be premixed with the source-material-containing gas, which contains the organosilicon, has a temperature greater than or equal to the liquefaction temperature of the organosilicon, which liquefaction temperature is determined depending on the amount of the organosilicon contained in the premixed source material gas. This makes it possible to prevent cooling of the premixed source material gas which cooling is caused by premixing the source-material-containing gas with the oxygen gas. In turn, the organosilicon contained in the premixed source material gas is prevented from liquefying. The above method therefore makes it possible to prevent problems that would be caused by liquefaction of the organosilicon.

Thus, using the method for manufacturing an optical fiber preform in accordance with the present embodiment makes it possible to manufacture an optical fiber preform while preventing organosilicon from liquefying prior to a reaction by which SiO$_2$ soot is produced, so as to improve safety and stability of the reaction. Furthermore, since the organosilicon is provided for the reaction in a gaseous or atomized state, the organosilicon is highly reactive. This makes it possible to improve a quality of the SiO$_2$ soot. As a result, it is possible to manufacture a high-quality optical fiber safely and efficiently by using an optical fiber preform manufactured via the above method.

The above method is preferably arranged such that a seal gas by which the premixed source material gas and the combustion gas are separated from each other is supplied to the burner, the seal gas having a temperature equal to or greater than the liquefaction temperature of the organosilicon.

Using the seal gas makes it possible to (i) prevent, soot from being produced at an end face (outlet) of the burner by the organosilicon reacting at the end face (outlet) of the burner and (ii) control a position of the reaction. In a case where the seal gas having an approximately ordinary temperature is supplied to the burner, the temperature of the premixed source material gas supplied to the same burner will drop, thereby potentially causing the organosilicon to liquefy. With the above method, however, the seal gas supplied to the burner has a temperature greater than or equal to the liquefaction temperature of the organosilicon, which liquefaction temperature is dependent on the amount of the organosilicon contained in the premixed source material gas. This makes it possible to prevent cooling of the premixed source material gas which cooling is caused by supplying the seal gas to the burner. In turn, the organosilicon contained in the premixed source material gas is prevented from liquefying. It therefore becomes possible to prevent problems that would be caused by the liquefaction, of the organosilicon.

Thus, the above method makes it possible to manufacture an optical fiber preform while more reliably preventing organosilicon from liquefying prior to a reaction by which $SiO_2$ soot is produced, so as to improve safety and stability of the reaction.

Furthermore, the above method is preferably arranged such that, in the step (a), the oxygen gas has a temperature of 110° C. or greater.

Since the source-material-containing gas is typically vaporized at a high temperature (200° C., for example), using the oxygen gas having a temperature of 110° C. or greater ensures that the temperature of the premixed source material gas will be at least 110° C. or greater. In a case where (i) it is intended that the amount of the organosilicon to be reacted is increased and (ii) the premixed source material gas is below 110° C., it would become necessary that the premixed source material gas containing an unfeasibly large amount of the other gases be sent to the burner. However, in a case where the oxygen gas is 110° C. or greater as in the above method, the premixed source material gas will have a temperature of at least 110° C. or greater. This requires merely a feasible amount of the other gases. It thus becomes possible to manufacture an optical fiber preform conveniently.

Note that in a case where OMCTS is used as the organosilicon, it is assumed that a vapor pressure of the OMCTS is 0.129 atm at 110° C. Due to this fact, in a case where a partial pressure of the OMCTS contained in the premixed source material gas is 0.129 atm or lower, it is possible to, by premixing the source-material-containing gas with the oxygen gas having a temperature of 110° C. or greater, reliably prevent the liquefaction of the organosilicon which liquefaction is caused by premixing.

Furthermore, the above method is preferably arranged such that the seal gas supplied to the burner has a temperature greater than or equal to that of the oxygen gas.

In a case where the temperature of the seal gas is lower than that of the premixed source material gas, the premixed source material gas will be cooled while flowing through the burner. However, in a case where the seal gas has the same temperature as the oxygen gas (a temperature greater than or equal to the liquefaction temperature of the organosilicon), it is possible to prevent a drop in the temperature of the premixed source material gas flowing through the burner. This makes it possible to prevent liquefaction of the organosilicon contained in the premixed source material gas.

Furthermore, the above method is preferably arranged such that the source-material-containing gas contains, as a carrier gas, oxygen, a mixed gas composed of argon and oxygen, or a mixed gas composed of nitrogen and oxygen.

According to the above arrangement, it is possible to use oxygen, a mixed gas composed of argon arid oxygen, or a mixed gas composed of nitrogen and oxygen, as a carrier gas for carrying the organosilicon.

In a case where a supplied amount of the organosilicon (source material gas) is small in proportion to a diameter of a tube, supply of the organosilicon may become unstable, i.e., difficult to control because a flow velocity of the organosilicon is low (because a volume of the organosilicon supplied is small). Because of this, the source material gas is mixed with a carrier gas in order to increase a volume of the source material gas and stabilize, the supply of the source material gas, despite resultant dilution of the source material gas.

It is possible to safely carry the source material gas by using argon or nitrogen as a carrier gas. However, it is undesirable to increase a ratio of argon or nitrogen in the premixed source material gas. This is because argon and nitrogen are not involved in the reaction. As such, it is preferable to mix oxygen into the carrier gas, the rest of the carrier gas being argon or nitrogen. This oxygen is added to the extent, that backfiring (a phenomenon in which a flame retrogresses into the burner) does not occur. An amount of oxygen at which backfiring does not occur is determined in accordance with, for example, a flammability limit concentration and a flow rate (flow velocity) of the source material gas in the tube.

Thus, according the above arrangement, by using, as the carrier gas, a mixed gas composed of (i) argon and oxygen or (ii) nitrogen and oxygen, it becomes possible to more safely carry the source material gas. Alternatively, if safety has otherwise been ensured, then oxygen can be used as the carrier gas. Using oxygen as the carrier gas enables greater efficiency of combustion of the source material gas.

Furthermore, the above method is preferably arranged such that the seal gas is argon.

Argon is an inert gas typically used as a seal gas. Since argon is easily obtainable, its use facilitates manufacture of the optical fiber preform.

Furthermore, the above method can be arranged such that a multi-nozzle burner having a plurality of nozzles or a multi-tube burner may be used as the burner.

Furthermore, the above method can be arranged such that octamethylcyclotetrasiloxane or hexamethyldisiloxane, for example, can be used as the organosilicon.

Furthermore, the scope of the present invention also encompasses: an optical fiber preform manufactured by the above method for manufacturing an optical fiber preform; a method for manufacturing an optical fiber which method employs the above method for manufacturing an optical fiber preform; and an optical fiber manufactured by the method for manufacturing an optical fiber.

The present invention is not limited to the description of the embodiment and examples above, but may be altered by a skilled person within the scope of the claims. An embodiment based on a proper combination of technical means disclosed in the embodiment and examples is encompassed in the technical scope of the present invention.

REFERENCE SIGNS LIST

2a Source-material-containing gas
5a Premix-use oxygen gas
7a Premixed source material gas
20 Burner
22a Seal gas
30 Reaction field

The invention claimed is:
1. A method for manufacturing an optical fiber preform, the method comprising the steps of:

(a) premixing a source-material-containing gas with an oxygen gas in a premixing chamber so as to obtain a premixed source material gas, the source-material-containing gas containing organosilicon which is in a gaseous or atomized state; and (b) producing $SiO_2$ soot by (i) supplying, to a burner, the premixed source material gas and a combustion gas and (ii) reacting the organosilicon in a flame, in the step (a), the oxygen gas being supplied to the premixing chamber via a first tube that is different from a second tube via which the combustion gas is supplied and the oxygen gas being heated in the first tube to a temperature greater than or equal to a liquefaction temperature of the organosilicon, which liquefaction temperature is dependent on an amount of the organosilicon contained in the premixed source material gas, wherein the method further comprises (c) heating the oxygen gas to a first temperature in the first tube independently from the source-material-containing gas, the first temperature being different from a temperature of the source-material-containing gas, and varying the first temperature in accordance with the amount of the organosilicon contained in the premixed source material gas.

2. The method as set forth in claim 1, wherein a seal gas by which the premixed source material gas and the combustion gas are separated from each other is supplied to the burner, the seal gas having a temperature equal to or greater than the liquefaction temperature of the organosilicon.

3. The method as set forth in claim 2, wherein the seal gas supplied to the burner has a temperature greater than or equal to that of the oxygen gas.

4. The method as set forth in claim 2, wherein the seal gas is argon.

5. The method as set forth in claim 1, wherein in the step (a), the oxygen gas has a temperature of 110° C. or greater.

6. The method as set forth in claim 1, wherein the source-material-containing gas contains, as a carrier gas, oxygen, a mixed gas composed of argon and oxygen, or a mixed gas composed of nitrogen and oxygen.

7. The method as set forth in claim 1, wherein the burner is a multi-nozzle burner having a plurality of nozzles.

8. The method as set forth in claim 1, wherein the burner is a multi-tube burner.

9. The method as set forth in claim 1, wherein the organosilicon is octamethylcyclotetrasiloxane.

10. The method as set forth in claim 1, wherein the organosilicon is hexamethyldisiloxane.

11. The method as set forth in claim 1, further comprising:
heating the oxygen gas in the first tube independently from the combustion gas.

12. The method as set forth in claim 1, wherein the first temperature is lower than the temperature of the source-material-containing gas.

* * * * *